L. F. ADT.
NOSE GUARD FOR EYEGLASSES.
APPLICATION FILED JULY 17, 1907.
977,152.
Patented Nov. 29, 1910.
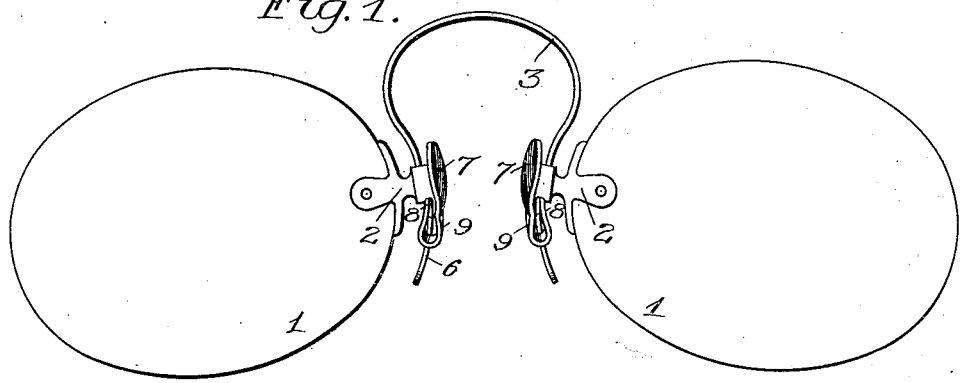
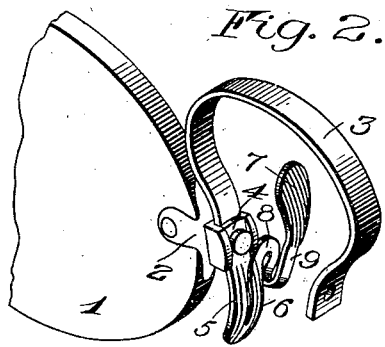
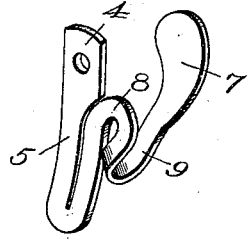
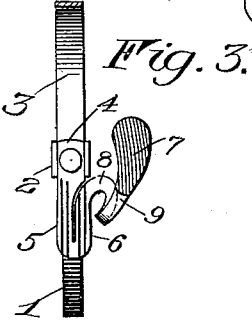
Witnesses
Walter B. Payne.
H. H. Simms
Inventor
L. F. Adt.
By French & Rich
his Attorneys

UNITED STATES PATENT OFFICE.

LEO F. ADT, OF ALBANY, NEW YORK.

NOSE-GUARD FOR EYEGLASSES.

977,152.     Specification of Letters Patent.     Patented Nov. 29, 1910.

Application filed July 17, 1907. Serial No. 384,270.

*To all whom it may concern:*

Be it known that I, LEO F. ADT, of Albany, in the county of Albany and State of New York, have invented certain new and useful Improvements in Nose-Guards for Eyeglasses; and I do hereby declare the following to be a full, clear, and exact description of the same, reference being had to the accompanying drawings, forming a part of the specification, and to the reference-numerals marked thereon.

The present invention, which relates to nose guards for eyeglasses of the type employing a lower bearing pad and an upper bearing pad offset therefrom to provide separated or non-continuous bearing surfaces and adjustable to accommodate the eyeglasses to different noses, has for an object to provide a device which will utilize the lower bearing pad to give greater resiliency to the upper pad and in which the adjustment of the latter will not affect the position of the lower pad.

To these and other ends the invention consists in certain improvements and combinations of parts all as will be hereinafter more fully described, the novel features being pointed out in the claims at the end of the specification.

In the drawings: Figure 1 is a front view of a pair of eyeglasses embodying my invention: Fig. 2 is a perspective view of a portion of a lens, one of the guards and a spring bridge. Fig. 3 is a central transverse section through the eyeglasses, and Fig. 4 is a perspective view of one of the guards.

Referring particularly to the drawings 1 indicates a pair of lenses, 2 the lens attaching devices or boxes having in the present instance vertically arranged seats, and 3 the bridge spring, all of which may be of any suitable form or construction.

Suitably secured to the eyeglasses, as by vertical or upwardly extending attaching ends 4 fitting in the vertical seats of the boxes 2, are the nose guards which in this instance each comprise a downwardly extending loop adapted to bear against the nose to form the lower bearing pad, the arms 5 and 6 of which preferably lie substantially parallel and between the lenses with the bearing faces thereof in a plane transverse to the plane of the lenses; one arm 5 having its upper end carrying the attaching end 4 and the other arm having the upper bearing pad 7 adjustable independently thereof substantially transversely of the plane of the lenses and also substantially parallel to said plane. The means permitting this adjustment preferably comprises a vertical or upwardly extending loop 8 arranged substantially transverse to the plane of the lenses and having one arm merging into the arm 6 of the lower bearing pad and another arm curved forwardly with a deflection slightly outwardly and resiliently connected at its lower end to an upwardly extending arm 9 having an enlarged end forming the upper bearing pad 7, the resilient connection also serving to permit the adjustment of the pad in a plane parallel to the plane of the lenses and being, in this instance, in the form of a loop lying substantially in a plane parallel to the plane of the lenses and preferably made by an inward and upward bend of the material.

The loops at the upper end of the lower pad provide bends which offset the upper pad inwardly and thus form separated bearing surfaces between the pads. While these bends are in this instance employed for the adjustment of the upper pad, it is apparent that any bend that will serve the function of offsetting the upper pad from an arm of the lower pad is within the scope of my invention.

The guard in this instance is made from flat stock, the downwardly extending loop 6 being formed by a vertical slit, the upwardly extending loop 8 being provided by an edgewise return bend of the material and the resilient loop being made by a return bend flatwise of the material.

It will be noted that the arms of the lower nose bearing pad are arranged very close together, and as the area upon which the pads are to bear is limited, the range of adjustment of the upper pad is thereby increased; and further that the adjustment of the upper pad either perpendicularly to its bearing face or transversely thereto does not affect the position of the lower pad, although the latter increases the resiliency of the upper pad.

I claim as my invention:

1. A nose guard for eyeglasses comprising a downwardly looped lower nose engaging pad, an attaching end secured to the upper end of one arm of the pad, an upper nose engaging pad, and means connecting the upper pad to the upper end of the other arm of the loop embodying two loops, one lying substantially in the plane of the arms of the lower loop, and the other lying substantially transverse to said plane.

2. The combination with a pair of lenses and a bridge connecting them, of nose guards each comprising a downwardly extending looped lower nose engaging pad, having one arm in advance of the other, the forward arm being secured and the rearward arm being movable relatively to the secured arm, an upper nose engaging pad, and a connection between the rear arm of the lower nose engaging loop and the upper pad embodying a loop permitting the adjustment of the upper pad independently of the lower pad.

3. The combination with a pair of lenses and a bridge connecting them, of nose guards each comprising a downwardly extending looped lower nose engaging pad, having one arm in advance of the other, the forward arm being secured and the rear arm being movable relatively to the secured arm, an upper nose engaging pad, and a connection between the rear arm of the lower nose engaging loop and the upper pad embodying an upwardly extending pliable loop permitting the adjustment of the upper pad independently of the lower pad.

4. The combination with a pair of lenses and a bridge connecting them, of nose guards each comprising a downwardly extending looped nose engaging pad having only the forward arm thereof secured, and the other arm movable independently thereof, an upper nose engaging pad and a connection between the rear arm of the lower nose engaging loop and the upper pad embodying an upwardly extending loop permitting the adjustment of the upper pad independently of the lower pad.

5. The combination with a pair of lenses and a bridge connecting them, of nose guards each comprising a downwardly extending loop having its arms arranged substantially transverse to the plane of the lenses and forming a lower bearing pad, the rear arm being movable relatively to the forward arm, an upwardly extending pliable loop having its arms also arranged substantially transverse to the plane of the lens, and one arm merging into the rear arm of the lower bearing pad, and an upper bearing pad connected to the other arm of the upwardly extending loop.

6. The combination with a pair of lenses and a bridge connecting them, of guards comprising a lower looped nose bearing pad having only its forward arm secured and its rear arm movable relatively to the forward arm, an upper bearing pad, and a connection between the other arm of the lower pad and the upper pad, embodying an upwardly and a downwardly extending loop.

7. The combination with a pair of lenses and a bridge connecting them, of guards each comprising a lower looped nose bearing pad having one arm only secured, an upper bearing pad, and a connection between the other arm of the lower pad and the upper pad, embodying two loops one arranged substantially transverse to the plane of the lenses, and the other arranged substantially parallel thereto.

8. A nose guard formed of flat stock and comprising an attaching end, a downwardly extending loop having its forward arm connected to the attaching end, and its rear arm movable relatively to the attached end, an upwardly extending loop formed by an edgewise bend in the stock, having its arms arranged substantially in the plane of the downwardly extending loop and connected to the rear arm of the latter, a downwardly extending loop formed by a flatwise bend of the stock, in the direction of the plane of the lenses connected to the upwardly extending loop and arranged in a plane transverse to the plane of the latter, an arm extending from one arm of the last mentioned downwardly extending loop, and a bearing pad carried by said arm.

9. A nose guard comprising a downwardly extending loop, one arm of which is arranged in advance of the other to form the lower pad, an attaching end carried by the forward arm of the loop, an upper pad, and a downwardly extending loop having one arm connected to the upper end of the rear arm of the lower pad and its other end connected to the upper pad, said arms lying in a plane transverse to the plane of the lower pad.

10. A nose guard comprising a downwardly extending loop, one arm of which is arranged in advance of the other to form the lower pad, an attaching end on the forward arm, the rearward arm being movable relatively to the forward arm, an upper pad, and a downwardly extending loop having its arms in a plane transverse to the plane of the lower pad, one arm of the last mentioned loop being connected to the movable arm of the lower pad and the other arm being secured to the upper pad.

11. A nose guard comprising a downwardly extending loop, one of which is arranged in advance of the other to form the lower pad, an attaching end on the forward arm, the rearward arm being movable relatively to the forward arm, an upper pad, and a downwardly extending loop having its arms in a plane transverse to the plane of the lower pad, one arm of the last mentioned loop being connected to the movable arm of the lower pad and the other arm being secured to the lower edge of the upper pad.

12. A nose guard formed from flat stock and comprising a downwardly extending loop, the arms of which are arranged edgewise to each other and in substantially the same plane, an attaching end carried by the front arm of the loop, an upper pad, and a downwardly extending loop formed by flat bends in the stock and having its arms lying in a plane transverse to the plane of the first named downwardly extending loop.

LEO F. ADT.

Witnesses:
  JAMES F. BYRON,
  JAS. B. EGAN.